US008185688B2

(12) United States Patent
Wan

(10) Patent No.: US 8,185,688 B2
(45) Date of Patent: May 22, 2012

(54) METHOD FOR MANAGING THE ADDRESS MAPPING TABLE IN A FLASH MEMORY

(75) Inventor: Hongbo Wan, Guangdong (CN)

(73) Assignee: NETAC Technology Co., Ltd., Guangdong (CN)

( * ) Notice: Subject to any disclaimer, the term of this patent is extended or adjusted under 35 U.S.C. 154(b) by 589 days.

(21) Appl. No.: 11/992,479

(22) PCT Filed: Sep. 25, 2006

(86) PCT No.: PCT/CN2006/002516
§ 371 (c)(1),
(2), (4) Date: Aug. 11, 2009

(87) PCT Pub. No.: WO2007/033614
PCT Pub. Date: Mar. 29, 2007

(65) Prior Publication Data
US 2009/0313417 A1 Dec. 17, 2009

(51) Int. Cl.
*G06F 12/10* (2006.01)
(52) U.S. Cl. ........................................ 711/107; 711/206
(58) Field of Classification Search .................... None
See application file for complete search history.

(56) References Cited

U.S. PATENT DOCUMENTS

| 6,646,917 | B1 | 11/2003 | Yoshimura | |
|---|---|---|---|---|
| 2002/0184436 | A1* | 12/2002 | Kim et al. | 711/103 |
| 2004/0015674 | A1* | 1/2004 | Lakhani et al. | 711/206 |
| 2004/0111553 | A1 | 6/2004 | Conley | |
| 2005/0154818 | A1* | 7/2005 | Chen | 711/103 |
| 2005/0278481 | A1* | 12/2005 | Lakhani et al. | 711/103 |

FOREIGN PATENT DOCUMENTS

| CN | 1420440 | 5/2003 |
|---|---|---|
| CN | 1518000 | 8/2004 |
| JP | 2001-142774 | 5/2001 |
| WO | 2004040431 | 5/2004 |

* cited by examiner

Primary Examiner — Than Nguyen
(74) Attorney, Agent, or Firm — Morgan, Lewis & Bockius LLP

(57) ABSTRACT

A method for data management in a flash memory medium is provided in the present invention, The method comprises the following steps: dividing a plurality of blocks of the flash memory medium into two or more sections; generating a section-address-mapping table by scanning logic addresses in the blocks in each section; storing the section-address-mapping table into a backup block in each section; and performing an operation of writing/reading by reading the section-address-mapping table, storing the section-address-mapping table to a RAM, and performing a conversion between a physical address and a logic address based on the section-address-mapping table stored in the RAM. Since the section-address-mapping tables are stored in the backup block in respective sections, when an operation of writing/reading is performed and it is necessary to switch to a section-address-mapping table for a next section, data stored in the next section can be read out based on the section-address-mapping table stored in the backup block in the next section, without needing to scan each block in the next section for generating a new section-address-mapping table dynamically. Therefore, the method of the present invention can save the time for operation and thus achieve effective management on data in the flash memory medium.

6 Claims, 1 Drawing Sheet

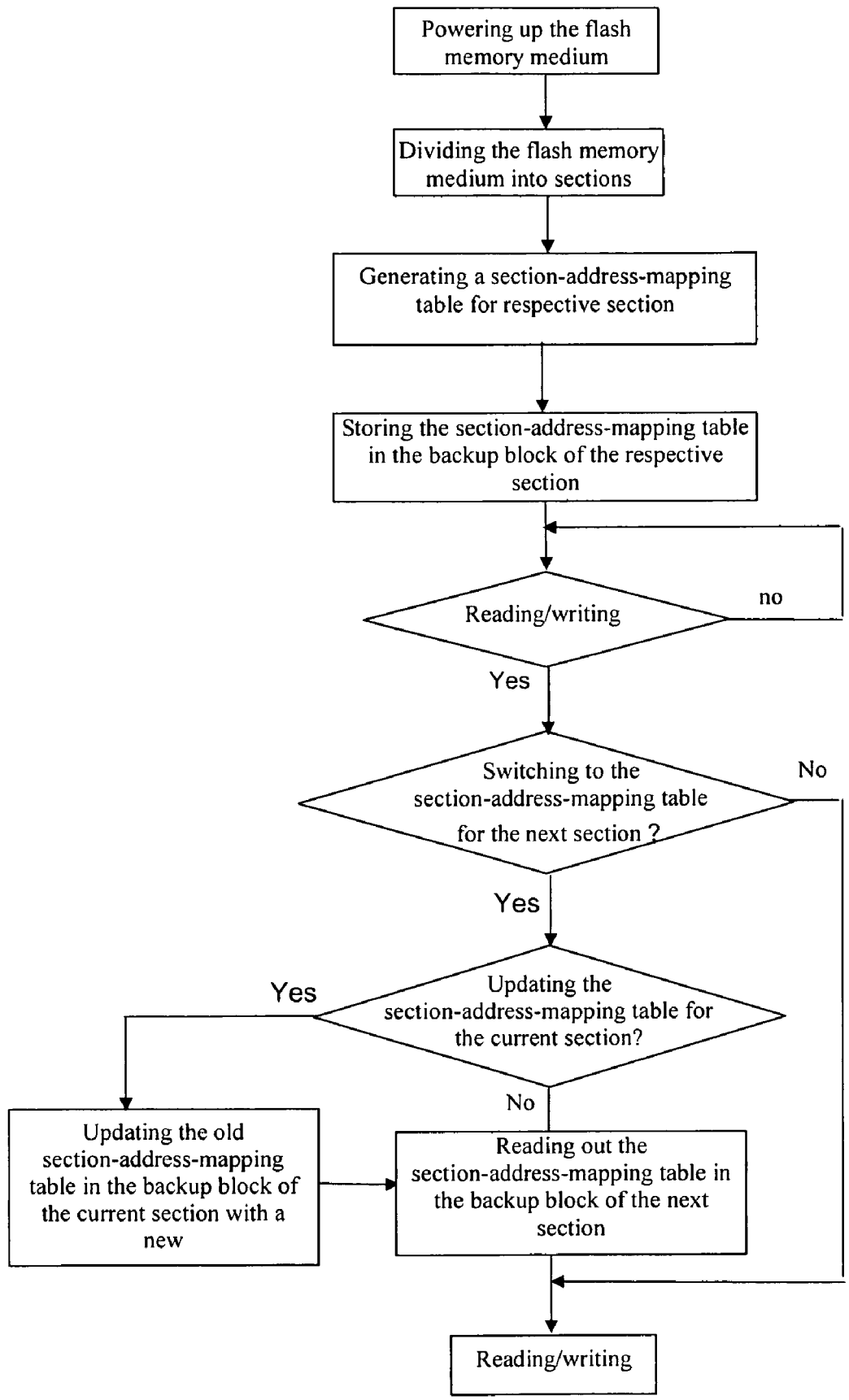

METHOD FOR MANAGING THE ADDRESS MAPPING TABLE IN A FLASH MEMORY

TECHNICAL FIELD

The present invention relates to a method for data management in a semiconductor memory medium, more particularly, to a method for data management in a flash memory medium.

BACKGROUND OF THE INVENTION

Nowadays, a mobile storing device with flash memory medium is widely used as a substitute for floppy disks and floppy drivers. Due to non-volatility and programmability, the flash memory medium is widely used in devices such as mobile phone, PDA and MP3 or the like.

The flash memory medium can randomly access data stored therein in a manner similar with accessing RAMs, other volatile storage medium, and magnetic disks, but correct and delete the stored data in a different way from those existing ones. That is, when data in a certain block of the flash memory medium are deleted, a section including said block is also deleted. Herein, a plurality of bytes with physically continuous addresses is known as a "block", which acts as a basic unit to be operated in the flash memory medium. In addition, during the deleting operation, the section composed of a plurality of blocks in the flash memory medium is physically deleted as a basic unit at a time.

A flash memory medium comprises a plurality of sections, each of which is composed of a plurality of blocks. Thus, data in a flash memory medium is generally accessed in terms of blocks other than bytes as used in RAM. An address allocated to a block is known as a physical address. A virtual address of each block in a user's computer is known as a logic address. The logic address and the physical address can be converted to each other via mapping such as via an address-mapping table including mapping information.

Since firmware of the flash memory medium is limited and the capacity of RAM is relatively small, the mapping information stored in the RAM is only one section-address-mapping table corresponding to a certain section. Each section of the flash memory medium corresponds to respective section-address-mapping table. When a file stored in more than one section of the flash memory medium is read, the corresponding section-address-mapping tables are frequently switched in the RAM and a new section-address-mapping table should be established for each switching. When a new section-address-mapping table is established, each block in those read sections is scanned so that a corresponding section-address-mapping table is dynamically generated based on the physical address of each scanned block. Therefore, it costs much time for the flash memory medium to read a file stored in more than one section, resulting in a low-efficiency of data management in the flash memory medium.

SUMMARY OF THE INVENTION

A method for data management in a flash memory medium is provided in the invention for enhancing the efficiency of reading/writing data.

The present invention provides a method for data management in a flash memory medium, the flash memory medium comprising a plurality of blocks, each of which comprises a plurality of pages, each page comprising data storing bits and redundancy bits, the method comprising the following steps:

1) dividing the plurality of blocks of the flash memory medium into two or more sections;

2) generating a section-address-mapping table by scanning logic addresses in the blocks in each section;

3) storing the section-address-mapping table into a backup block in each section; and 4) performing an operation of writing/reading by reading the section-address-mapping table, storing the section-address-mapping table to a RAM, and performing a conversion between a physical address and a logic address based on the section-address-mapping table stored in the RAM.

When the flash memory medium performs the operation of reading/writing, whenever it is necessary to switch to a section-address-mapping table for a next section, the operation can be performed based on the section-address-mapping table stored in the backup block of the next section, without needing to scan each block in the next section for generating a section-address-mapping table according to physical addresses of every block to establish a new section-address-mapping table.

When the flash memory medium performs the operation of writing, whenever it is necessary to generate a new section-address-section, it is only needed to store the new section-address-mapping table in the backup block of the current section to update the old one. Also, when another operation is performed and switching to the section-address-mapping table in said section is needed, it is not necessary to scan every block in said section for generating a section-address-mapping table. Instead, it is only needed to read the updated section-address-mapping table from the backup block and store the table to the RAM.

Compared to the prior art, the present invention has the following advantages. According to the present invention, the section-address-mapping tables are stored in the backup block in respective sections. When an operation of writing/reading is performed and switching to a section-address-mapping table for a next section is needed, data can be read out based on the section-address-mapping table stored in the backup block in the next section, without needing to scan each block in the next section for generating a new section-address-mapping table. Therefore, the method of the present invention can save the time for data operation and thus achieve effective management on data in the flash memory medium.

BRIEF DESCRIPTION OF THE DRAWING

FIG. 1 is a flow chart of a method for data management in a flash memory medium according to the present invention.

DETAILED DESCRIPTION

The present invention will be described in detail with reference to following embodiments.

In an embodiment of the present invention, a flash memory medium comprises a plurality of blocks, each of which further comprises a plurality of pages. Each page comprises data storing bits and redundancy bits. A flow chart of the method for data management according to the present invention is shown as FIG. 1, comprising the following steps:

1) powering up a device containing a flash memory medium;

2) dividing blocks of the flash memory medium into two or more sections;

3) scanning all the blocks contained in all the sections under the control of firmware, and generating a plurality of section-address-mapping tables each of which corresponds to one of the sections, respectively, wherein all the sectionaddress-mapping tables constitute an address-mapping table for the flash memory medium;

4) storing each of the section-address-mapping tables into a backup block in respective section;

5) determining whether an operation of reading/writing data exists in a current section;

6) determining whether it is necessary to switch from the section-address-mapping table for the current section to the section-address-mapping table for a next section when the operation of reading/writing exists; if not necessary, performing the operation of reading/writing directly; and 7) determining whether the section-address-mapping table of the current section needs to be changed due to an operation of writing, if the switching is needed; if the changing is needed, storing the changed section-address-mapping table into the backup block in the current section for updating the section-address-mapping table for the current section; and if no change is needed, reading the section-address-mapping table for the next section in a corresponding backup block of the next section and storing the table to a RAM, and performing a conversion between a physical address and a logic address based on the section-address-mapping table stored in the RAM, so as to perform the operation of reading/writing.

The above-mentioned backup blocks for storing the section-address-mapping tables are randomly determined and specified with a variable by the firmware, and scanned at the time when the device containing a flash memory medium is powered up.

The flash memory medium performs the operation of reading/writing in view of blocks. If switching to a section-address-mapping table for a next section is needed, the operation can be performed based on the section-address-mapping table stored in the backup block of the next section, without needing to scan each block in the next section for generating a corresponding section-address-mapping table according to the physical address of every block to establish a new section-address-mapping table.

If the section-address-mapping table of the current section is changed due to an operation of writing in the current section, what is to be done is to store a new section-address-mapping table in the backup block in the current section for updating the old one. Also, when another operation is performed and switching to the section-address-mapping table in said section is needed, it is not necessary to scan every block in said section for generating a corresponding section-address-mapping table according to the physical address of every block. Instead, what is needed is to read the updated section-address-mapping table from the corresponding backup block and store it to the RAM.

Since an operation of writing will result in changing the section-address-mapping table, the present invention utilizes a process for updating the section-address-mapping table by means of a switch-block, which can eliminate the damage of the flash memory medium, comprising:

1) writing the generated new section-address-mapping table into a switch-block;

2) correlating physical address of the switch-block with the logic address of the backup block storing the old section-address-mapping table; and 3) correlating the physical address of the backup block storing the old section-address-mapping table to the logic address of the switch-block; and labeling the backup block storing the old section-address-mapping table as a switch-block.

According to the present invention, the section-address-mapping table is stored in the backup block. When the flash memory medium performs an operation of reading/writing on a file which is large than one section and thus it is necessary to switch to the section-address-mapping table in a next section, the operation can be performed based on the section-address-mapping table stored in the backup block of the next section, without scanning every block in the next section for generating corresponding section-address-mapping tables dynamically according to the physical address of every block to establish a new section-address-mapping table. Therefore, the present invention is able to reduce the time for operation of reading/writing so as to enhance the efficiency of data management in a flash memory medium.

The advantageous effect of the present invention as mentioned above becomes more appreciable when the flash memory medium is in a write protection state. When a flash memory medium is in the write protection state and a file is to be read, the file name of the file and the file address for storing the file should be searched for. The search is carried out from the root directory stage by stage, until the file name and the file address are found. If an operation for reading/writing is done in view of a large file, switching the section-data-mapping table of one section to that of the next section is needed. Thus, the search from the root directory is done stage by stage for dynamically generating new section-address-mapping tables sequentially should be done, which costs a lot of time. When applying the present invention to the flash memory medium in the write protection state, whenever switching the section-address-mapping table of one section to that of the next section, the operation of writing/reading is performed according to the section-address-mapping table stored in the backup block of the next section. When the search is done from the root directory, it is not necessary to generate a new section-address-mapping table successively. Thus, the time consuming for the search is significantly reduced and the efficiency of data management in a flash memory medium is improved.

According to the invention, the backup block for storing the section-address-mapping table may be specified. The backup block may be arranged in each of the sections or located at other available positions in the flash memory medium. The backup blocks may set with a particular label in redundancy bits or be identified in other ways.

According to the invention, when the device containing the flash memory medium is powered up, section-address-mapping tables for all sections may be established, respectively. Alternatively, only one section-address-mapping table for one certain section or section-address-mapping tables for some sections may be established. The rest sections may establish their respective section-address-mapping tables when the switch is needed. In this manner, section-address-mapping tables corresponding to all the sections are established gradually.

The method according to the invention may be used in a hyperstable technique to ensure the stability of the flash memory medium, even though an illegal break happens. The hyperstable technique comprises setting up a state label in redundancy bits in at least one page in at least one block; setting the state label as "unfinished" when an operation of writing/reading is performed in said block; and setting the state label as "finished" once the operation is completed. Once an illegal break happens, the state of each of the blocks is determined by checking the state label. Thus, the data to be saved can be retrieved and an operation for resuming data is performed, so as to achieve a stable management of the flash memory medium. The hyperstable technique can be referred to Chinese patent application No. 03104983.4.

The above-mentioned method for data management in a flash memory medium can be widely used in portable devices containing a flash memory medium, such as mobile storage device, audio player (e.g., MP3, MP4, etc.), digital camera, calculator, game player, mobile phone, notebook, portable printer, etc. for speeding up the operation of reading/writing.

The invention claimed is:

1. A method for data management in a flash memory medium, the flash memory medium comprising a plurality of blocks, each of which comprises a plurality of pages, each page comprising data storing bits and redundancy bits, the method comprising:
   1) dividing the plurality of blocks into two or more sections;
   2) generating a section-address-mapping table by scanning logic addresses of the blocks in each section;
   3) storing the section-address-mapping table into a backup block of the respective section;
   4) performing an operation of reading/writing by loading the section-address-mapping table into a RAM to map the logic addresses to corresponding physical addresses;
   5) generating a new section-address-mapping table based on new logic addresses of blocks in a certain section;
   6) storing the new section-address-mapping table in a backup block in the certain section to update the section-address-mapping table stored in the backup block; and
   7) performing the operation of reading/writing by performing a conversion between physical addresses and logic addresses based on the new section-address-mapping table,
   wherein said updating is performed by a switch-block and comprises the following steps:
      storing the new section-address-mapping table into the switch-block;
      correlating a physical address of the switch-block with a logic address of the backup block which stores the section-address-mapping table; and
      correlating a physical address of the backup block with a logic address of the switch block and labeling the backup block as a new switch-block,
   wherein the backup block is randomly determined.

2. The method of claim 1, wherein the backup block is positioned in the respective sections.

3. The method of claim 1, wherein the section-address-mapping table is generated by scanning the blocks in at least one section.

4. The method of claim 1, wherein the backup block is specified with variables by a firmware.

5. The method of claim 4, wherein the backup block is identified by a label set in redundancy bits.

6. The method of claim 1, wherein a state label is set up in the redundancy bits in at least one page in at least one block in a way that, when the operation of reading/writing is performed in said block, the state label is set as "unfinished"; and after the operation is completed, the state label is set as "finished".

* * * * *